UNITED STATES PATENT OFFICE.

HEINRICH HOERLEIN, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

PHENYLETHYLBARBITURIC ACID.

13,477. Specification of Reissued Letters Patent. Reissued Oct. 15, 1912.

No Drawing. Original No. 1,025,872, dated May 7, 1912, Serial No. 647,902. Application for reissue filed September 12, 1912. Serial No. 720,087.

*To all whom it may concern:*

Be it known that I, HEINRICH HOERLEIN, doctor of philosophy, chemist, citizen of the German Empire, residing at Vohwinkel, near Elberfeld, Germany, have invented new and useful Improvements in Phenylethylbarbituric Acid, of which the following is a specification.

My invention relates to the manufacture and production of the hitherto unknown phenylethylbarbituric acid having the formula:

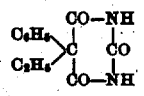

which has proved to be a valuable hypnotic; an average dose being from ¼ to ½ gram. The process for its production consists in condensing phenyl-theylmalonic acid ester with urea in the presence of sodium alcoholate

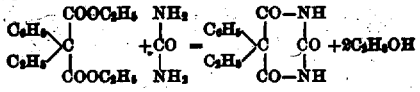

In order to illustrate the new process more fully the following example is given, the parts being by weight:—264 parts of phenylethyl-malonic acid ester (=1 mol.) are added to a solution of 69 parts of sodium (=3 mol.) in 1200 parts of absolute alcohol. 90 parts of urea (=1.5 mol.) are added thereto and the mixture is heated to boiling in a vessel provided with a reflux condenser during 6 hours. Subsequently the mixture is filtered the alcohol is distilled off *in vacuo*, water is added to the residue and a precipitate thus obtained is filtered off. The alkalin filtrate is heated and the heated liquid is neutralized with dilute hydrochloric acid. The phenylethylbarbituric acid precipitates from the cooling liquid.

My new substance crystallizes from water in the shape of white leaflets melting at 173–174° C. It possesses the property of forming salts with many metals *e. g.* the alkali metals, or the calcium, the hydrogen of the NH group being replaced by the metal. It may be either used in the acid or salt form. The sodium salt is a white crystalline powder easily soluble in water.

I claim:—

The herein described phenylethylbarbituric acid of the formula:

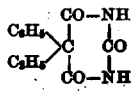

crystallizing from water in the shape of white leaflets melting at 173–174° C.; forming salts with alkali metals and calcium; and being a valuable hypnotic, substantially as described.

In testimony whereof I have hereunto set my hand in the presence of two subscribing witnesses.

HEINRICH HOERLEIN. [L. S.]

Witnesses:

HELEN NUFER,

ALBERT NUFER.